United States Patent [19]

Cheng et al.

[11] Patent Number: 5,737,402
[45] Date of Patent: Apr. 7, 1998

[54] COIN RELEASE MECHANISM OF PAY PHONE

[75] Inventors: Li-Te Cheng; Sung-Min Lin, both of Taipei, Taiwan

[73] Assignee: Karlin Telecomm Corporation, Taipei, Taiwan

[21] Appl. No.: 714,277

[22] Filed: Sep. 17, 1996

[51] Int. Cl.⁶ .................................................. H04M 17/00
[52] U.S. Cl. ........................... 379/150; 379/153; 194/345
[58] Field of Search ........................ 379/143, 145, 379/146, 147, 148, 149, 150, 151, 153, 155, 428, 437, 440, 447, 451, 453; 312/223.4; 52/27.5; 194/323, 345

[56] References Cited

U.S. PATENT DOCUMENTS

| 4,809,319 | 2/1989 | McGough | 379/153 |
| 4,815,123 | 3/1989 | McGough | 379/153 |
| 5,299,673 | 4/1994 | Wu | 194/345 |

*Primary Examiner*—Curtis Kuntz
*Assistant Examiner*—Binh K. Tieu
*Attorney, Agent, or Firm*—Christensen O'Connor; Johnson & Kindness pllc

[57] ABSTRACT

A pay phone coin release mechanism includes a base plate fixed inside the pay phone casing and having a pivot pin extending therefrom to rotatably supported thereon a driven link having two opposite arms of which one has a pin formed thereon and the other one rotatably supports thereon a coin release roller adapted to cooperate with a conventional coin receiving mechanism. The base plate also has a hole through which a shaft rotatably extends to drivingly engage a driving link. The driving link has an elongated slot into which the pin of the driven link extends and drivingly engages. The shaft of the driving link extends outside the pay phone casing and connected to a user-actuateable lever so that by actuating the lever, the driving link is rotated to drive, through the connection between the elongated slot and the pin, the driven link to rotate about the pivot. A biasing spring is provided between the driving link and the base plate to bias the driving toward a un-actuated position defined by contact engagement between an extension of the driving link and a stop provided on the base plate.

6 Claims, 5 Drawing Sheets

COIN RELEASE MECHANISM OF PAY PHONE

FIELD OF THE INVENTION

The present invention relates generally to a coin release mechanism and in particular to a simplified coin release mechanism to be used in a pay phone.

BACKGROUND OF THE INVENTION

A pay phone is a phone which receives coins from a user to be operable and the coins are returned to the user if a call is not successful or if it takes less amount to complete the call. Thus, the pay phone is devised with a coin release mechanism arranged inside the casing of the phone and in mechanical coupling with a coin release lever which is located outside the phone casing and accessible by the phone user. Examples of the known coin release mechanism are shown in FIGS. 3-4 of the accompanying drawings.

In FIG. 3, a first example of the conventional coin release mechanism, which is generally designated with reference A, is shown. The coin release mechanism A comprises a base plate A1 fixed inside the phone casing and having a driven link A2 pivoted thereon. A roller A21 is rotatably supported on the link A2. A driving link A4 is arranged to be rotatable by the coin release lever. An intermediate link A3 pivoted at two opposite ends to both the driven link A2 and the driving link A4 so that rotating the coin release lever causes the roller A21 to move via the links A2, A3 and A4. The movement of the roller A21 forces the coin receiving mechanism to release the coins to the coin return chute. The coin release mechanism A is also provided with biasing means A5 for maintaining and returning the driving link A4 and thus the coin release lever back to the un-actuated position. Further, a stop pin, designated at 51, is formed and fixed on an inside surface of the phone casing to stop the movement of the coin release mechanism A at a desired position.

The base plate A1 and the links A2, A3 and A4 of the coin release mechanism A need to be mounted in a precise manner in order to operate and function properly for all these members A1-A4 have to be individually mounted to the inside surface of the phone casing and then connected to each other. This increases the difficulty of manufacturing. Besides, it needs a stop pin formed on the inside surface of the phone casing to restrict the movement of the mechanism A which increases the cost of manufacturing of the phone itself.

In FIG. 4, a second example of the conventional coin release mechanism, generally designated with reference B, that is used in a pay phone is shown. Similarly, the coin release mechanism B comprises a base plate B1 fixed inside the phone casing, a driving link B4 in mechanical coupling with the coin release lever, a driven link B2 pivoted to the base plate B1 and having a roller B21 rotatably supported thereon for actuating the coin receiving mechanism to return the coin, and an intermediate link B3 having two ends respectively pivoted to the driving link B4 and the driven link B2. Biasing means B5 and the stop pin 51 are also needed.

Similar to the first example, the second example conventional coin release mechanism B also suffers the problem of mounting the members B1-B4 in a precise manner to the inside surface of the pay phone. The stop pin formed on the inside surface of the pay phone is also needed.

Another similar example of the conventional coin release mechanism is shown in FIG. 5 and generally designated with reference C. The coin release mechanism C similarly comprises a base plate C1 fixed inside the phone casing, a driving link C4 in mechanical coupling with the coin release lever, a driven link C2 pivoted to the base plate C1 and having a roller C21 rotatably supported thereon for actuating the coin receiving mechanism to return the coin, and an intermediate link C3 having two ends respectively pivoted to the driving link C4 and the driven link C2. Biasing means C5 and the stop pin (not shown in FIG. 5) are also needed. Similar drawbacks occur in this conventional coin release mechanism C.

It is therefore desirable to have a coin release mechanism for use in a pay phone which has a simplified construction and thus lower cost in manufacturing.

SUMMARY OF THE INVENTION

An object of the present invention is to provide a pay phone coin release mechanism which is simplified as compared with the conventional structure so as to reduce the manufacturing cost.

Another object of the present invention is to provide a pay phone coin release mechanism wherein all the parts are integrated into a single unit so as to increase the efficiency of manufacturing and assembly.

Yet a further object of the present invention is to provide pay phone coin release mechanism which needs no separate stop pin formed and fixed on the inside surface of the phone casing so as to reduce the cost of the phone itself.

To achieve the above objects, there is provided a pay phone coin release mechanism comprising a base plate fixed inside the pay phone casing and having a pivot pin extending therefrom to rotatably supported thereon a driven link having two opposite arms of which one has a pin formed thereon and the other one rotatably supports thereon a coin release roller adapted to cooperate with a conventional coin receiving mechanism. The base plate also has a hole through which a shaft rotatably extends to drivingly engage a driving link. The driving link has an elongated slot into which the pin of the driven link extends and drivingly engages. The shaft of the driving link extends outside the pay phone casing and connected to a user-actuateable lever so that by actuating the lever, the driving link is rotated to drive, through the connection between the elongated slot and the pin, the driven link to rotate about the pivot. A biasing spring is provided between the driving link and the base plate to bias the driving toward a un-actuated position defined by contact engagement between an extension of the driving link and a stop provided on the base plate.

These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
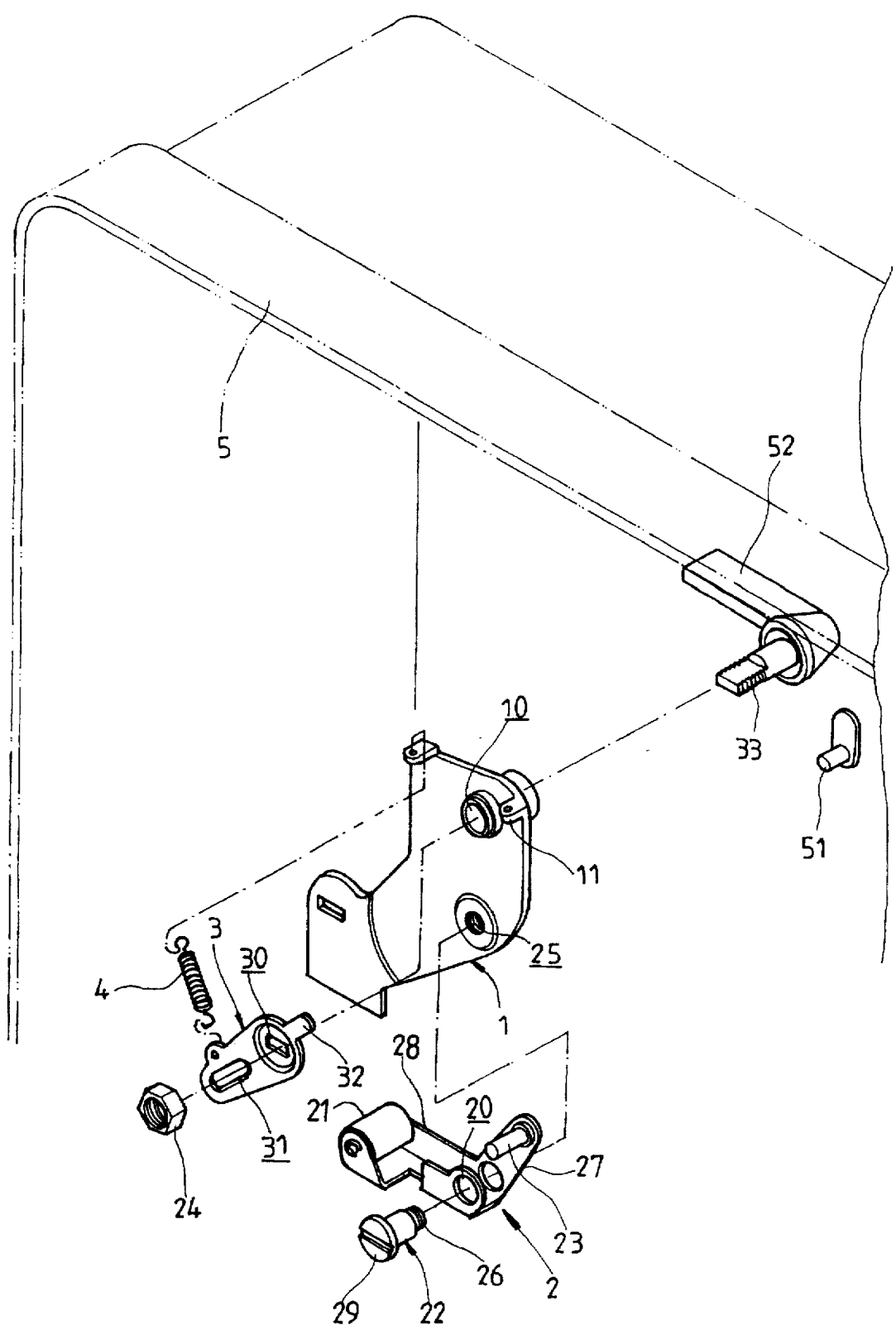
FIG. 1 is an exploded perspective view showing a coin release mechanism for use in a pay phone constructed in accordance with the present invention with a portion of the phone casing shown with phantom lines.
Figure 2:
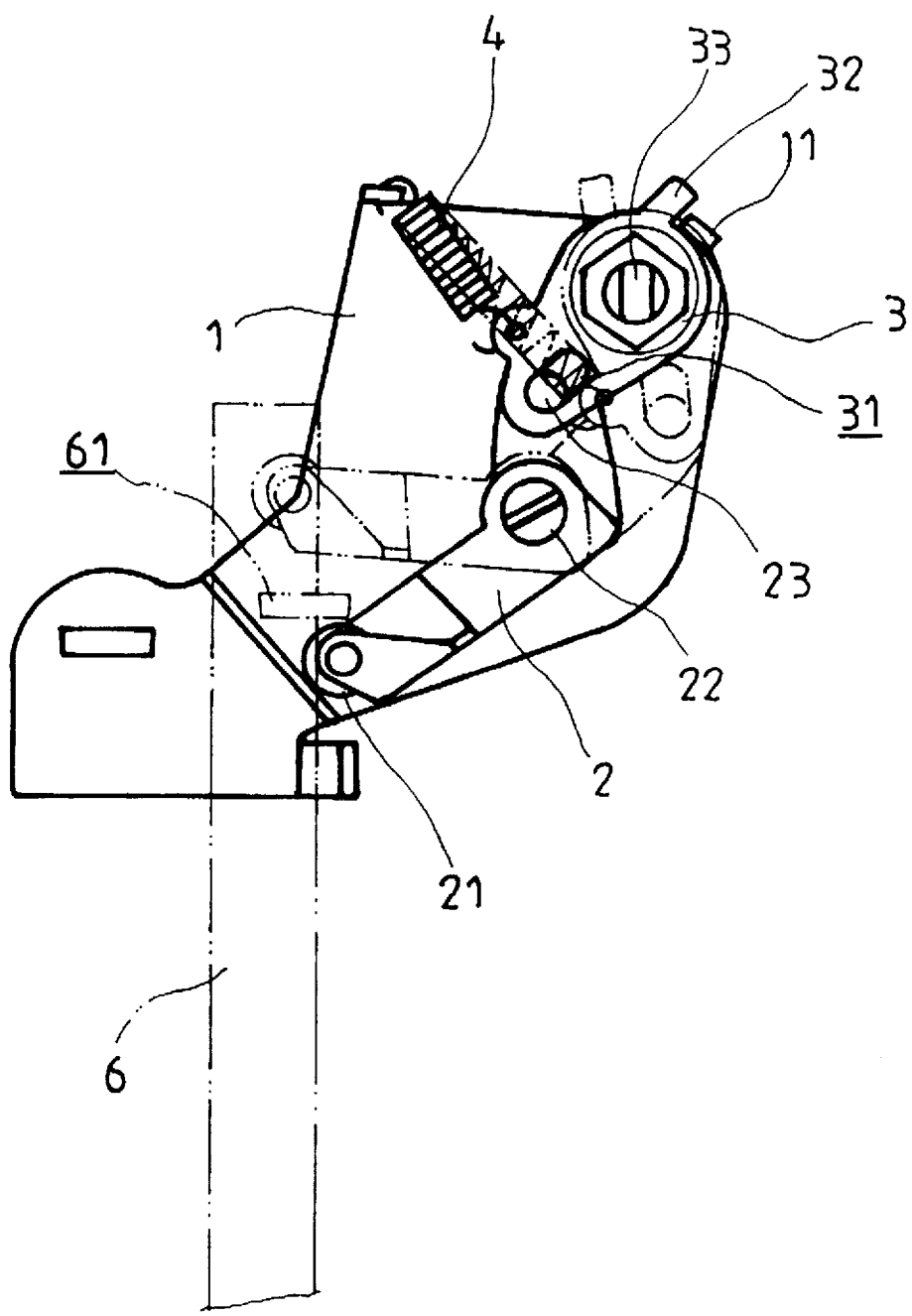
FIG. 2 is a side view of the coin release mechanism of FIG. 1, a coin receiving mechanism and a coin release bar of the coin receiving mechanism being also shown to illustrate the operation of the coin release mechanism.
Figure 3:
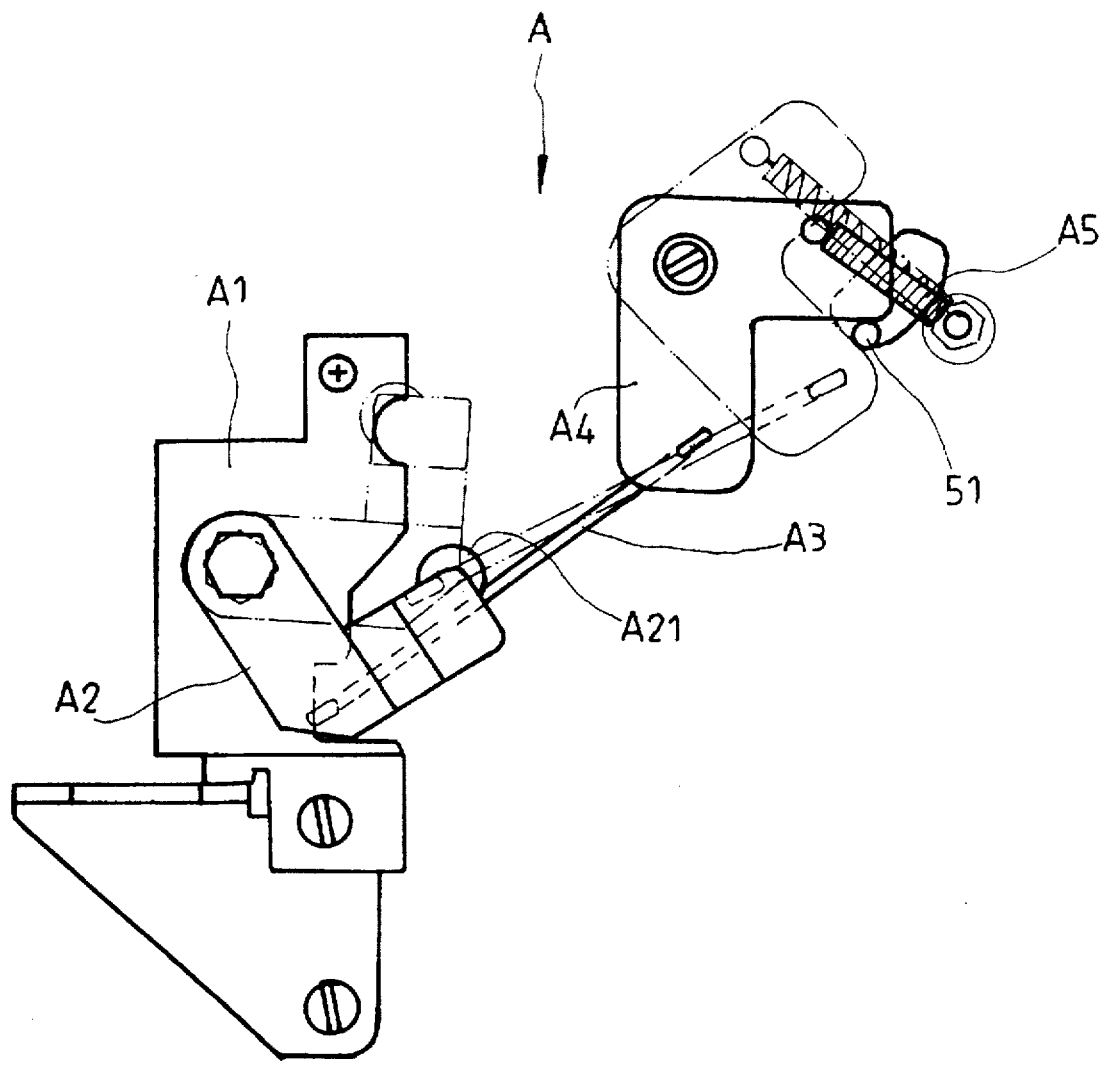
FIGS. 3-5 are side views showing three conventional coin release mechanisms that are currently known.
Figure 4:
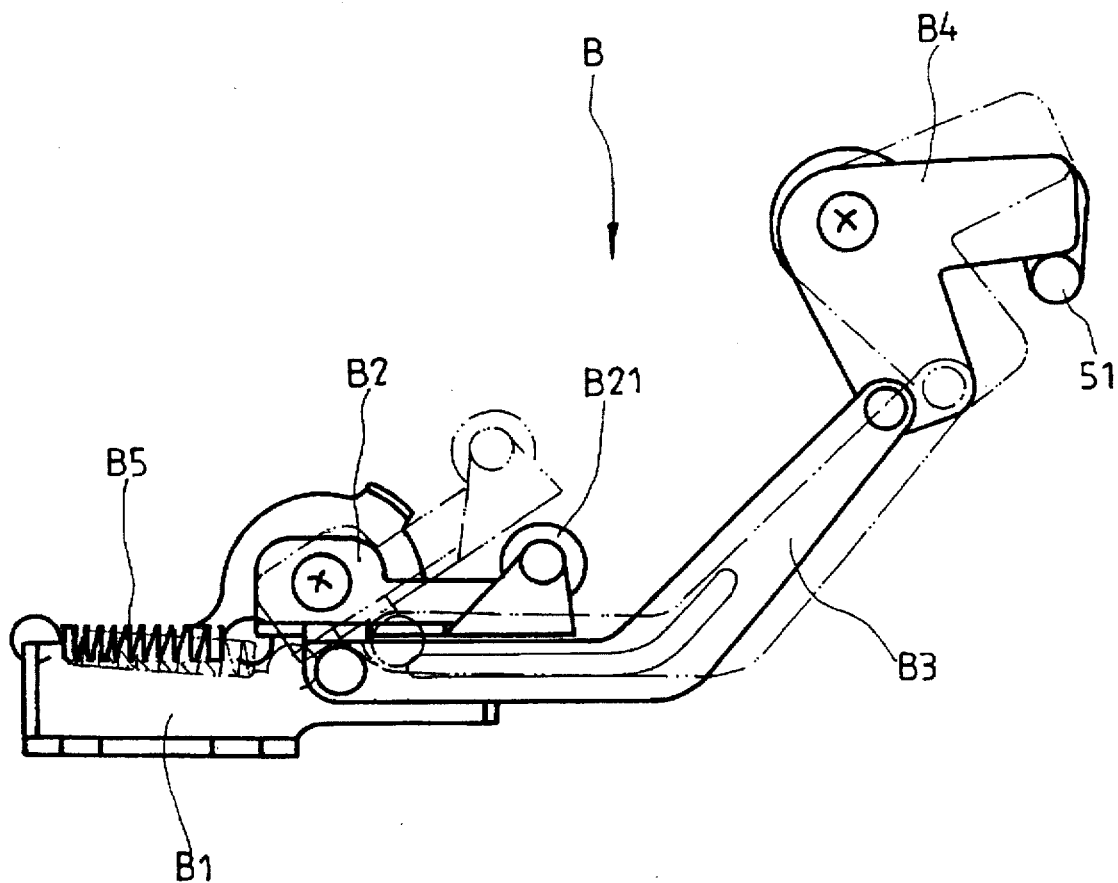
Figure 5:
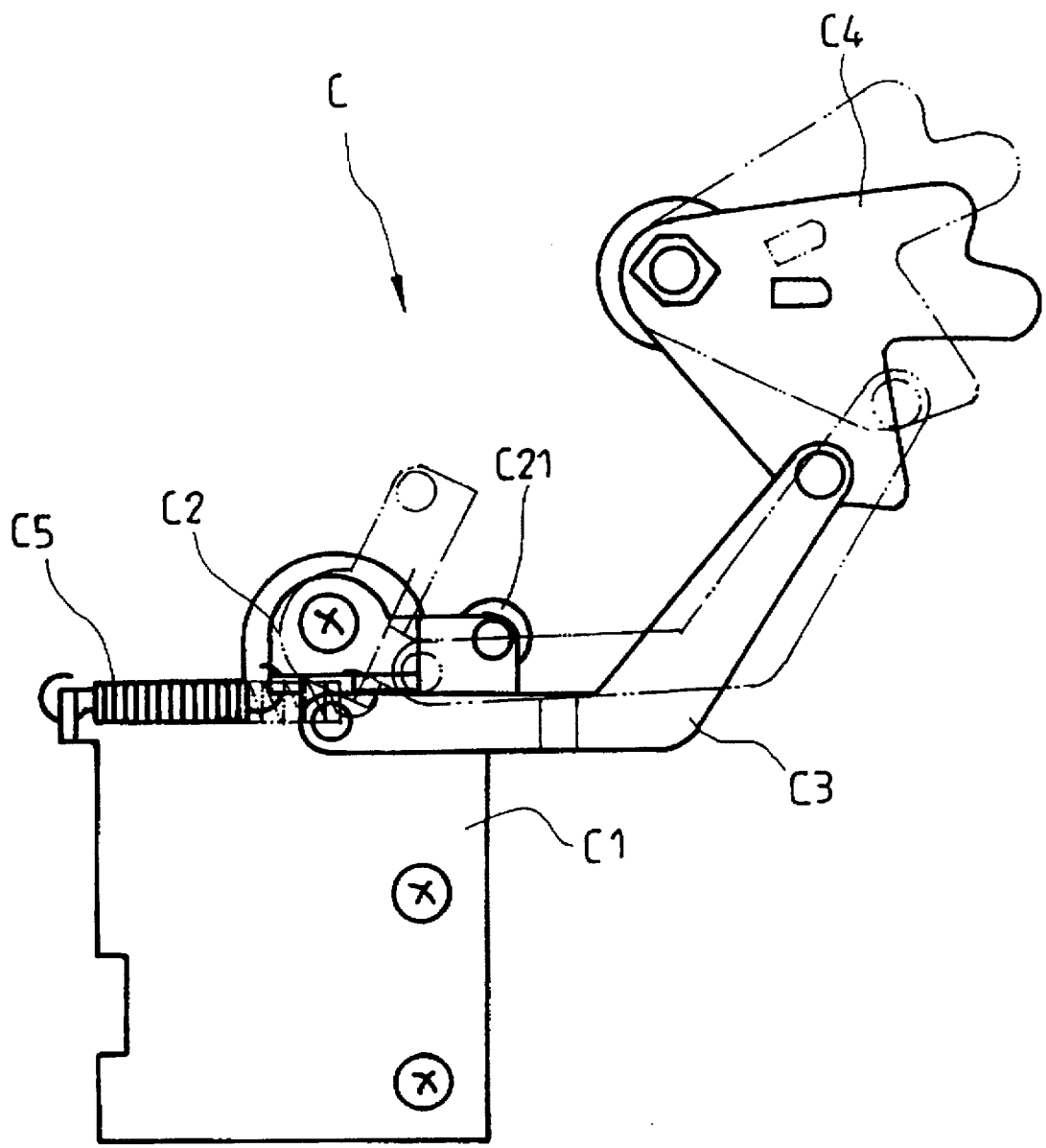

Referring to the drawings and in particular to FIGS. 1 and, wherein a coin release mechanism for a pay phone constructed in accordance with the present invention is shown, the coin release mechanism in accordance with the present invention comprises a base plate 1 adapted to fix inside the casing 5 of a pay phone and having a pivot pin 22 extending therefrom to rotatably support thereon a driven link 2 which in turn rotatably supports a roller 21 and a driving link 3 which is rotatably supported on the base plate 1 by means of a pivot shaft 33 coupled to and driven by a coin release lever 52 located outside the casing 5 and accessible by a user. The driving link 3 is rotatably and movably connected to the driven link 2 so that when the driving link 3 is actuated with the coin release lever 52, the driven link 2 is driven to move the roller 21 to perform, in cooperation with the conventional coin receiving mechanism 6 (FIG. 2) that is known to the art, the coin release operation.

In the embodiment illustrated, the rotatable support of the driving link 3 on the base plate 1 is achieved by the pivot shaft 33 which has an outer end extending through the casing 5 and connected to the coin release lever 52 to be rotatable in unison therewith and an opposite inner end extending through a hole 10 formed on the base plate 1 to have the shaft 33 rotatably received and supported within the hole 10. The pivot shaft 33 also extends through a hole 30 formed on the driving link 3 to drivingly engage the driving link 3.

The driving engagement between the driving link 3 and the pivot shaft 33 may be achieved by any suitable known means. For example, the pivot shaft 33 may be provided with a shaped section at the inner end thereof with threading thereon to which a nut 24 engages to secure the driving link 3 on the pivot shaft 33. The hole 30 formed on the driving link 3 is given a shape corresponding to that of the threaded section of the shaft 33 so as to achieve the driving engagement therebetween.

The driven link 2 has a pivot hole 20 through which the pivot pin 22 extends. Preferably the pivot pin 22 has a threaded end 26 to threadingly engage and fix to an inner-threaded bore 25 formed on the base plate 1 to rotatably support the driven link 2. Preferably, the pivot 22 also has an expanded end 29 opposite to the threaded end 26 for maintaining the driven link 2 on the pivot 22. The driven link 2 has two arms 27 and 28, preferably defining an obtuse angle therebetween. A pin 31 extending from a first arm 27 of the driven link 2 to be slidably received within an elongated slot 31 formed on the driving link 3 so as to form a movable connection therebetween which the pin 32 to move along the elongate slot 31 during the movement of the driven link 2 driven by the driving link 3. The roller 21 is rotatably fixed on a second arm 28 of the driving link 2 to be substantially opposite to the pin 31. Actuating the lever 52 to rotate the shaft 33 causes the driving link 3 to rotate about the shaft 33 between an un-actuated position and an actuated position so as to drive the driven link 2 to rotate about the pivot 22 by means of the connection between the pin 23 of the driven link 2 and the elongated slot 31 of the driving link 3 and thus move the roller 21 to release the coin from a coin receiving slot 61 of the conventional coin receiving mechanism 6 schematically shown in FIG. 2.

Biasing means, such as a spring 4, is provided to bias the driving link 3 toward the un-actuated position and to return the driving link 3 back to the un-actuated position once the lever 52 is actuated and released. In the embodiment illustrated, the spring 4 has a first end fixed to the driving link 3 and an opposite second end fixed to the base plate 1.

The base plate 1 is provided with a stop 11 which may be contacted by an extension 32 provided on the driving link 3 so as to stop the movement of the driving link 3 caused by the biasing force of the spring 4 and thus define the un-actuated position. Once the lever 52 is actuated and released, due to the spring 4, the driving link 3 is sprung back to the un-actuated position and stopped by the contact engagement between the extension 32 thereof and the stop 11 of the base plate 1.

With the design of the present invention, there is no need to provide the stop pin 51 on the phone casing 5 as is required in the conventional designs. The stop pin 51 is also shown in FIG. 1 for reference.

Those skilled in the art will readily recognize that various modifications of the present invention may be made without departing the scope of the present invention defined in the appended claim. Accordingly the preferred embodiment illustrated and discussed herein should be understood to be exemplary only in nature and the scope of the instant invention should be limited only by the following claims.

What is claimed is:

1. A coin release mechanism comprising:

a base plate adapted to fix inside a casing, comprising a pivot pin and a stop formed thereon, the base plate further comprising a through hole through which an outer end of a rotating shaft extends outside the casing to be adapted to fix to a user-accessible lever and an inner end of the shaft extends into the casing;

a driving link which is drivingly engaged by and secured on the inner end of the shaft to be rotatable in unison therewith, having an elongated slot formed thereon, the driving link further comprising an extension to be contactable by the stop of the base plate to define a un-actuated position of the driving link;

a driven link having a hole received over the pivot pin of the base plate to allow the driven link to be rotatable relative to the base plate, the driven link comprising two arms substantially opposite to each other about the hole and defining therebetween an obtuse angle, one of the arms having a pin fixed thereon to be movably received within the elongated slot of the driving link and a second one of the arms having a roller rotatably supported thereon and adapted to cooperate with a coin receiving mechanism for returning coins therefrom; and biasing means arranged between the base plate and the driving link to bias the driving link toward the un-actuated position.

2. The coin release mechanism as claimed in claim 1, wherein the biasing means comprises a spring having a first end fixed to the driving link and a second end fixed to the base plate.

3. The coin release mechanism as claimed in claim 1, wherein the pivot pin of the base plate comprises a threaded end threadingly engaging an inner-threaded bore formed on the base plate.

4. The coin release mechanism as claimed in claim 1, wherein the pivot pin has an expanded end opposite to the threaded end for maintaining the driven link thereon.

5. The coin release mechanism as claimed in claim 1, wherein the inner end of the shaft has a shaped cross section to drivingly engage a hole of a complementary shape formed on the driving link.

6. The coin release mechanism as claimed in claim 5, wherein the inner end of the shaft is provided with threading to engage a nut for securing the driving link on the shaft.

* * * * *